US012585963B2

(12) United States Patent
Adriaenssen et al.

(10) Patent No.: US 12,585,963 B2
(45) Date of Patent: Mar. 24, 2026

(54) METHOD AND DEVICE FOR LEARNING A STRATEGY AND FOR IMPLEMENTING THE STRATEGY

(71) Applicant: Robert Bosch GmbH, Stuttgart (DE)

(72) Inventors: Steven Adriaenssen, Freiburg (DE); Andre Biedenkapp, Freiburg im Breisgau (DE); Frank Hutter, Freiburg im Breisgau (DE); Gresa Shala, Freiburg (DE); Marius Lindauer, Lehrte (DE); Noor Awad, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1157 days.

(21) Appl. No.: 17/305,586

(22) Filed: Jul. 9, 2021

(65) Prior Publication Data

US 2022/0027743 A1 Jan. 27, 2022

(30) Foreign Application Priority Data

Jul. 23, 2020 (DE) ..................... 10 2020 209 281.8

(51) Int. Cl.
*G06N 3/126* (2023.01)
(52) U.S. Cl.
CPC ................................... *G06N 3/126* (2013.01)
(58) Field of Classification Search
CPC ........ G06N 3/126; G06N 3/006; G06N 3/088; G06N 3/086; G06F 18/214; G06F 18/24; G06Q 10/04; G06Q 10/047
See application file for complete search history.

(56) References Cited

U.S. PATENT DOCUMENTS

| | | | | |
|---|---|---|---|---|
| 2018/0107175 A1* | 4/2018 | Ha | .......................... | G05B 11/01 |
| 2020/0012626 A1* | 1/2020 | Walters | .................. | G06N 3/044 |
| 2020/0292722 A1* | 9/2020 | Maucec | .................. | G01V 20/00 |
| 2021/0150407 A1* | 5/2021 | Xu | ........................... | G06N 5/02 |

(Continued)

FOREIGN PATENT DOCUMENTS

| | | |
|---|---|---|
| CN | 110110862 A | 8/2019 |
| CN | 111222902 A | 6/2020 |

(Continued)

OTHER PUBLICATIONS

Carius et al., "MPC-Net: A First Principles Guided Policy Search", Apr. 2020 (Year: 2020).*

(Continued)

*Primary Examiner* — Reji Kartholy
(74) *Attorney, Agent, or Firm* — NORTON ROSE FULBRIGHT US LLP

(57) ABSTRACT

A method for learning a strategy, which optimally adapts at least one parameter of an evolutionary algorithm. The method includes the following steps: initializing the strategy, which ascertains a parameterization of the parameter as a function of pieces of state information; learning the strategy with the aid of reinforcement learning, it being learned from interactions of the CMA-ES algorithm with a parameterization, determined with the aid of the strategy as a function of the pieces of state information, with the problem instance and with a reward signal, which parameterization is optimal for possible pieces of state information.

10 Claims, 8 Drawing Sheets

(56) References Cited

U.S. PATENT DOCUMENTS

| | | | | |
|---|---|---|---|---|
| 2021/0308863 A1* | 10/2021 | Liu | | B25J 9/163 |
| 2023/0169342 A1* | 6/2023 | Yu | | G06N 3/045 |
| | | | | 706/25 |

FOREIGN PATENT DOCUMENTS

| | | |
|---|---|---|
| JP | 2005202960 A | 7/2005 |
| JP | 2019046422 A | 3/2019 |

OTHER PUBLICATIONS

Loshchilov et al. "CMA-ES for Hyperparameter Optimization of Deep Neural Networks" (Year: 2016).*

Levine, S., Abbeel, P.: Learning neural network policies with guided policy search under unknown dynamics. In: Ghahramani, Z., Welling, M., Cortes, C., Lawrence, N., Weinberger, K. (eds.) Proceedings of the 28th International Conference on Advances in Neural Information Processing Systems (NeurIPS'14). pp. 1071{1079 (2014). https://papers.nips.cc/paper/2014/file/6766aa2750c19aad2fa1b32f36ed4aee-Paper.pdf. 9 Pages.

Levine, S., Koltun, V.: Guided policy search. In: Dasgupta, S., McAllester, D. (eds.) Proceedings of the 30th International Conference on Machine Learning (ICML'13). pp. 1 (2013). http://proceedings.mlr.press/v28/levine13.pdf. 9 Pages.

Hutter, F., Hoos, H., Leyton-Brown, K.: Sequential model-based optimization for general algorithm conguration. In: Coello, C. (ed.) Proceedings of the Fifth International Conference on Learning and Intelligent Optimization (LION'11). Lecture Notes in Computer Science, vol. 6683, pp. 507 (2011). https://ml.informatik.uni-freiburg.de/papers/11-LION5-SMAC.pdf. 15 Pages.

Mueller, et al. "Step Size Adaptation in Evolution Strategies using Reinforcement Learning," Proceedings of the 2002 Congress on Evolutionary Computation, and IEEE [online], (2002), pp. 1-6.

Chen, et al.: "Hyperparameter Optimization Method Based on Reinforcement Learning," J. of Chionese Computer Systems 41(4), (2020), pp. 679-684, with English abstract.

Feng, Ming Yong: Research and Application of Convolutional Neural Networks Based on the CMA-ES Algorithm, a dissertation, (2019), Harbin Eng. Univ., pp. 1-56, with English abstract.

* cited by examiner memory processing
unit

16

15 state ascertainer

12 problem instance

14

11 reward signal generator

13

S

R

A agent

10

METHOD AND DEVICE FOR LEARNING A STRATEGY AND FOR IMPLEMENTING THE STRATEGY

CROSS REFERENCE

The present application claims the benefit under 35 U.S.C. § 119 of German Patent Application No. DE 102020209281.8 filed on Jul. 23, 2020, which is expressly incorporated herein by reference in its entirety.

FIELD

The present invention relates to a method for learning and implementing a strategy, which is configured to parameterize an evolutionary algorithm, as well as to a computer program and to a machine-readable memory medium.

BACKGROUND INFORMATION

Evolution strategies (ES) are stochastic, derivation-free methods for numerically solving optimization problems. They belong to the class of evolutionary algorithms and of evolutionary computing. An evolutionary algorithm is based largely on the principle of biological evolution, namely, the repeated interaction of variation (by recombination and mutation) and selection: In each generation (so-called iteration) new individuals (so-called candidate solutions, x) are generated by variation, usually stochastically, of the instantaneous parent individuals. Some individuals are then selected on the basis of their fitness or of their objective functional value $F(x)$, in order to become the parents in the next generation. In this way, individuals having a constantly improving fitness are generated over the course of generations. CMA-ES (Covariance Matrix Adaptation Evolution Strategy) is an evolutionary algorithm for optimizing continuous "Black-Box Functions." This algorithm uses a particular type of strategy for numerical optimization. For this purpose, new candidate solutions x are randomly drawn according to a multivariate normal distribution in $R''$. The evolutionary recombination is achieved herein in that an adapted mean value is determined for the distribution. Pair-wise dependencies between the variables in the distribution are represented by a covariance matrix. The covariance matrix adaptation (CMA) is one method for updating the covariance matrix of this distribution.

To learn the sample distribution, only the ranking between the candidate solutions is utilized in CMA-ES, and neither derivations nor the functional values themselves are required by the method.

SUMMARY

Example embodiments of the present invention may have the advantage over the related art that the multivariate normal distribution is adapted situationally in an automated manner, as a result of which CMA-ES may be outperformed. Furthermore, it has been found from experiments that the generalization property of the approach according to an example embodiment of the present invention is high and the method may be applied directly for a broad spectrum of a wide variety of unseen further applications without the need to adapt the strategy to the new applications.

It has further been found that the approach according to an example embodiment of the present invention may also be applied to further evolutionary algorithms such as, for example, differential evolution.

In one first aspect, the present invention relates to a computer-implemented method for learning a strategy, which optimally adapts at least one parameter of an evolutionary algorithm, in particular, of a CMA-ES or differential evolution algorithm. In accordance with an example embodiment of the present invention, the method includes the following steps:

The strategy, which ascertains a parameterization of the parameters as a function of pieces of state information about a problem instance, in initialized. This is followed by a learning of the strategy with the aid of reinforcement learning. In the process, it is learned from interactions of the CMA-ES algorithm with the problem instance and with a parameterization of the parameters, which has been determined with the aid of the strategy as a function of the pieces of state information S, and a reward signal R, which parameterization is optimal for possible pieces of state information.

The parameter is preferably a step size of the CMA-ES algorithm, a number $\lambda$ of candidate solutions (population size), a mutation rate and/or crossover rate.

It is provided that the pieces of state information comprise the present parameterization of the parameter and a cumulative path length and/or at least one value, which is a difference between functional values of a function of the problem instance of the present iteration to be optimized and preceding iterations.

The pieces of state information preferably contain the parameterization for a plurality of preceding interactions. Particularly preferably, the last 40 iterations.

It is further provided that the state information also includes pieces of context information about the problem instance, in particular, a function to be optimized. The advantage herein is that the strategy may differentiate between different problem instances, as a result of which better results may be achieved for the individual problem instances.

The parameterization is the value that has been assigned to the parameter.

It is further provided that the reinforcement learning is employed using "Guided Policy Search" (GPS), parameterizations of the parameter being determined for the problem instance with the aid of a predefinable heuristic and a plurality of profiles of the parameterization of the parameter being recorded therefrom, a teacher for learning the strategy being provided from the profiles with the aid of GPS.

In one second aspect of the present invention, a method is provided for implementing the learned strategy according to the first aspect of the present invention. In accordance with an example embodiment of the present invention, tor this purpose, the pieces of state information for the present problem instance are determined. The learned strategy ascertains a parameterization as a function of the pieces of state information, CMA-ES being applied with this parameterization for at least one iteration. The two steps are preferably alternately repeated until an optimum is achieved.

It is provided that the problem instance is a training method for machine learning, hyperparameters of the training method being optimized with the aid of CMA-ES using the strategy, or the problem instance being a vehicle route optimization or an order planning in the manufacture/production and the route or the order planning being optimized with the aid of CMA-ES using the strategy. The order planning may, for example, be a processing of production steps.

It is further provided that a deep neural network is trained using the optimized hyperparameter. This neural network is preferably trained in such a way that this network ascertains an output variable as a function of a detected sensor variable of a sensor, which may subsequently be used to ascertain a control variable with the aid of a control unit.

The control variable may be used for controlling an actuator of a technical system. The technical system may, for example, be an at least semi-autonomous machine, an at least semi-autonomous vehicle, a robot, a tool, a factory machine or a flying object such as a drone. The input variable may, for example, be ascertained and provided as a function of the detected sensor data. The sensor data may be detected by a sensor such as, for example, a camera, of the technical system or alternatively received from external sources.

In further aspects, the present invention relates to a computer program, which is configured to carry out the above method(s) in accordance with the present invention and to a machine-readable memory medium, on which this computer program is stored.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
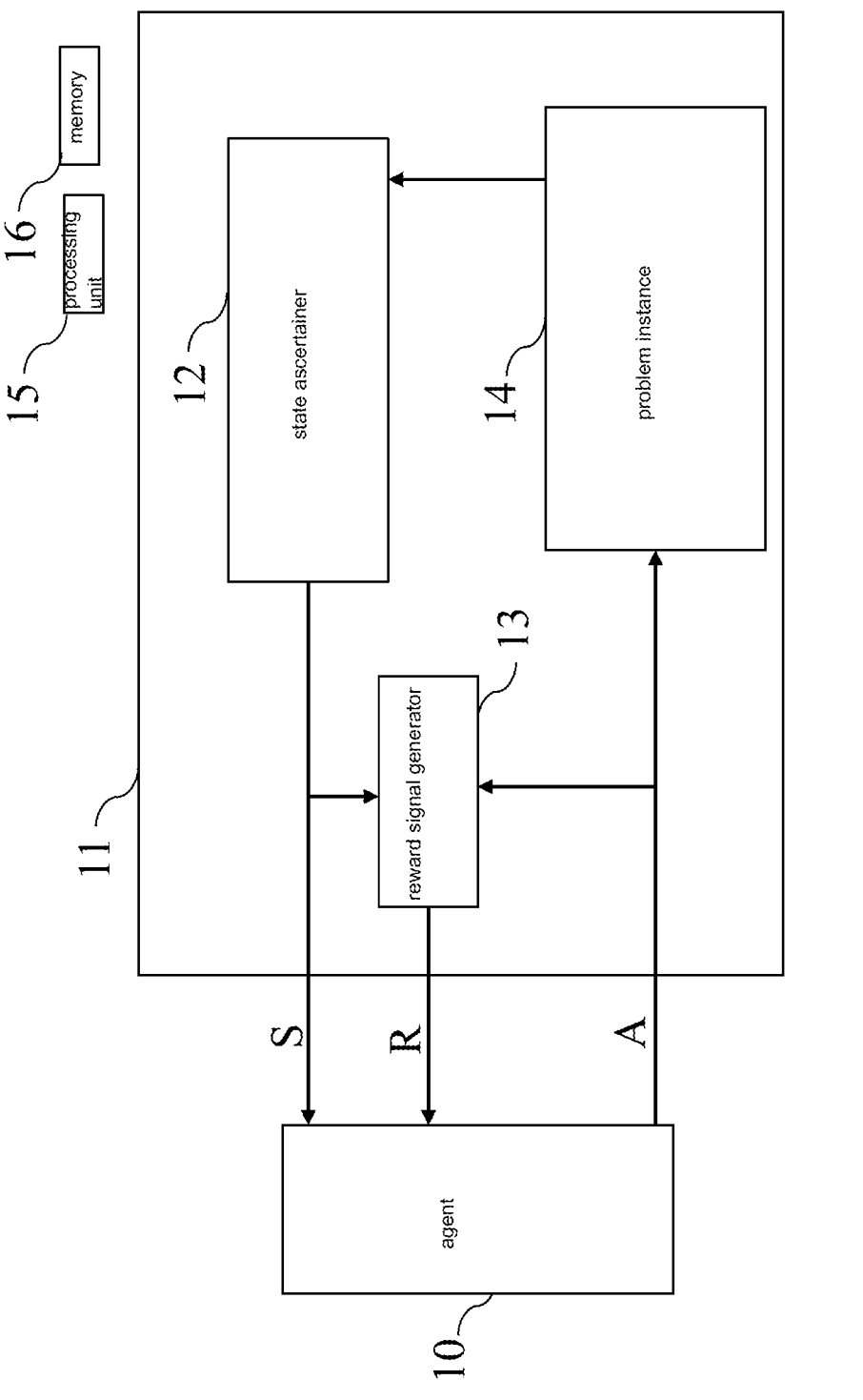
FIG. 1 schematically shows a device in accordance with one specific embodiment of the present invention.

Two main principles for the adaptation of parameters of the search distribution are utilized in the CMA-ES algorithm.

First, a maximum-likelihood principle, which is based on the idea of increasing the probability of successful candidate solutions and search steps. The mean value of the distribution is updated in such a way that the probability of previously successful candidate solutions is maximized. The covariance matrix of the distribution is (incrementally) updated in such a way that the probability of previously successful search steps is increased. Both updates may be interpreted as a natural gradient descent.

Second, two paths of the temporal development of the distribution means of the strategy are recorded, which are referred to as search and evolution paths. These paths contain significant pieces of information about the correlation between successive steps. When successive steps are undertaken, in particular, in a similar direction, the evolution paths become long. The evolution paths are utilized in two ways. The one path is used for the covariance matrix adaptation method instead of individual successful search steps, and enables a potentially much faster variance increase of the favorable directions. The other path is used for carrying out an additional step size control. This step size control is aimed at rendering successive movements of the distribution means orthogonal in expectation. The step size control effectively prevents a premature convergence, but allows for a rapid convergence to an optimum.

Mathematically, CMA-ES may be expressed as follows as an optimization algorithm of a continuous function $f:R^n\text{->}R$ by random drawing of candidate solutions from a multivariant normal distribution $N(m,\sigma^2 c)$, m corresponding to the expected value, $\sigma^2$ corresponding to the step size and c corresponding to the covariance matrix.

The covariance matrix may be initialized as an identity matrix and m and $\sigma^2$, for example, by random values or may be predefined by a user. CMA-ES then updates iteratively normal distribution N in order to increase the probability of successful candidate solutions.

For each iteration, also referred to as generation g, initially $\lambda$ candidate solutions $x^{(g+1)}$ are drawn, only the best $\mu$ candidate solutions being used as parents of next generation g+1. The number $\lambda$ of candidate solutions x may initially be set to a predefined value. Expected value m is subsequently adapted as follows:

$$m^{(g+1)} = m^{(g)} + c_m \sum_{i=1}^{\mu} w_i \left( x_{i:\lambda}^{(g+1)} - m^{(g)} \right) \qquad \text{(Equation 1)}$$

$c_m$ being a learning rate and being capable of being set, for example, equal to 1.

Step size c is subsequently adapted as follows, also known by Cumulate Step Length Adaptation (CSA):

$$\sigma^{(g+1)} = \sigma^{(g)} \exp\left( \frac{c_\sigma}{d_\sigma} \left( \frac{\|p_\sigma^{(g+1)}\|}{E\|N(0, I)\|} - 1 \right) \right) \qquad \text{(Equation 2)}$$

$c_\sigma < 1$ being a further learning rate and $d_\sigma \approx 1$ being a damping parameter, and $p_\sigma^{(g+1)}$ being a conjugated evolution path of generation g+1:

$$p_\sigma^{(g+1)} = (1 - c_\sigma) p_\sigma^{(g)} + \sqrt{c_\sigma(2 - c_\sigma)\mu_{\text{eff}}} \, C^{(g)-\frac{1}{2}} \frac{m^{(g+1)} - m^{(g)}}{\sigma^{(g)}} \qquad \text{(Equation 3)}$$

It should be noted that there is a multitude of further different possibilities for adapting step size $\sigma$ and it may, in general, be meaningful to alternate back and forth between these different possibilities when carrying out CMA-ES. For adapting covariance matrix c, reference is made to the literature regarding CMA-ES.

To increase the performance of CMA-ES, it is now provided that the adaptation of step size $\sigma^{(g+1)}$ according to Equation 2 is carried out as a function of pieces of state information $s_g$, a strategy (policy) $\pi(s_g)$ being used for this purpose. This means, a strategy $\pi$ is sought, which minimizes an (arbitrary) cost function, cost function L characterizing how well CMA-ES fares using the strategy.

This may be represented mathematically as follows:

$$\pi^* \in \underset{\pi \in \Pi}{\operatorname{argmin}} \sum_{f \in F} L(\pi, f) \qquad \text{(Equation 4)}$$

It is provided to determine the strategy with the aid of reinforcement learning. For this purpose, an action space is established, which is preferably continuous and includes possible values of step size $\sigma^{(g)}$.

State information $s_g$ may include the following states:
present step size $\sigma^{(g)}$;
present path $p_\sigma^{(g)}$; and/or
differences of the values of continuous function $f$ to be optimized from at least generation g and g−1.

The state information preferably includes a history of a plurality of previous step sizes. For this purpose, the last 40 step sizes are particularly preferably used. In addition, a history of the differences of the present functional value of function $f$ to be optimized from generation g may be added to the plurality of values from previous generations. If past values for the histories are not sufficiently present, these values may, for example, be filled in with zeros.

It is provided that cost function L is negative functional value $f(x)$ of the candidate that has fared the best within the present iteration. This has the advantage that the so-called anytime performance is optimized.

In the following exemplary embodiments, it is presented how the sample efficiency may be significantly improved. In this case, the strategy is not learned from zero on, but that it is provided with a teacher. Simulations have shown that to learn the strategy using reinforcement learning requires CMA-ES to be carried out approximately 10,000 times; if however, the teacher is integrated, then this value may be reduced to up to 1,100 CMA-ES implementations. Therefore, fewer interactions of the CMA-ES algorithm with its surroundings need to be carried out.

In one first exemplary embodiment, the teacher in the form of a self-adaptive heuristic is used, equation (Eq. 2) being used as the heuristic. It should be noted that other equations may also be used for determining the step size alternatively to equation (Eq. 2) such as, for example, a "two-point step-size adaptation."

In one preferred exemplary embodiment, the teacher is present in the form of a guiding trajectory, also known under the designation "guided policy search" (GPS). In this case, the strategy is adapted with the aid of supervisory learning in such a way that its output trajectory is very similar to the guiding trajectory.

For more details regarding GPS: Levine, S., Abbeel, P., "Learning neural network policies with guided policy search under unknown dynamics," in: Ghahramani, Z., Welling, M., Cortes, C., Lawrence, N., Weinberger, K. (eds.) Proceedings of the 28th International Conference on Advances in Neural Information Processing Systems (NeurIPS'14). pp. 1071-1079 (2014), retrievable online at: https://papers.nips.cc/paper/5444-learning-neural-network-policies-with-guided-policy-search-under-unknown-dynamics.pdf. Or: Levine, S., Koltun, V., "Guided policy search," in: Dasgupta, S., McAllester, D. (eds.) Proceedings of the 30th International Conference on Machine Learning (ICML'13). pp. 1 (2013), retrievable online at: http://proceedings.mlr.press/v28/levine13.pdf.

It is provided that the step sizes a determined by CMA-ES combined from successive generations g are used as guiding trajectories for GPS. This means, a plurality of guiding trajectories is determined, from which a teacher is then created; cf. above cited documents relating to GPS. The teacher in GPS is a "teacher distribution" (GPS: "trajectory distribution"/"guiding distribution"), which is determined in such a way that the teacher distribution maximizes the reward and, in particular, a deviation from strategy $\pi$ is minimized. Since GPS updates the teacher over time in order to improve the reward, it is likely that the teacher distances itself over time from the determined step sizes according to CMA-ES (in particular, according to equation (Eq. 2)), since only the pupil (strategy $\pi$) and the teacher are compelled by GPS to remain together. If both teacher as well as pupil deviate too far from CMA-ES-determined step sizes $\sigma$, it may be the case that the learned strategy if is unable to restore the behavior of the CMA-ES-determined step sizes $\sigma$.

The inventors therefore provide, in addition to the teacher, to use a further sampled trajectory of the step sizes $\sigma$ determined by CMA-ES in order to gain a more diverse learning experience. Thus, instead of limiting the student by a hard divergence criterion to the teacher in order to not be too far away from the trajectories of the teacher, it is possible to use a further sampled profile of step sizes $\sigma$ determined by CMA-ES as a trajectory. Also referred to below as additional teacher. The additional teacher may be ascertained as described above for the teacher.

In order to use the additional teacher with optimum effect, it is provided that GPS is expanded by introducing a sampling rate. The sampling rate characterizes in which proportion GPS will use the teacher track and the additional teacher for learning the strategy. It may be said that the sampling rate also determines to what extent the strategy resembles the approach of CMA-ES. Experiments have shown that a sampling rate of 0.3 for the additional teacher achieves the best results regardless of the type of function $f$. This would mean in other words that during the training, trajectory samples are used by the teacher with a probability of 0.7 and that trajectory samples are taken by the additional teacher with a probability of 0.3.

It should be noted that the teacher and/or additional teacher may also be a different heuristic, which determines the step size for CMA-ES.

Finally, it should be noted that to ensure the exploration during learning, the initial step size values and initial step size values for the mean value of the output distribution for the functions in the training set are randomly drawn from a uniform distribution.

A neural network made up of two hidden levels each including 50 hidden units and ReLu activations is preferably used as strategy $\pi$.

It should be noted that not only the step size, but also further parameters such as, for example, the size of the population of CMA-ES may be adapted based on the strategy if the strategy has also been optimized for such purpose. The parameters are preferably initially determined in advance with the aid of SMAC in order to obtain a suitable initialization.

SMAC is described in the publication by Hutter, F., Hoos, H., Leyton-Brown, K., "Sequential model-based optimization for general algorithm configuration," in: Coello, C. (ed.) Proceedings of the Fifth International Conference on Learning and Intelligent Optimization (LION'11), Lecture Notes in Computer Science, vol. 6683, pp. 507 (2011).

FIG. 1 shows by way of example a device for carrying out the method just described and for implementing strategy $\pi$. Agent 10 for reinforcement learning obtains on the one hand state information S and a reward signal R and outputs an action A. Action A then corresponds to step size σ. During the training of agent 10, GPS is carried out in order to learn strategy if as a function of state information S and reward signal B. During the implementation of agent 10, the strategy is applied, i.e., action A is determined as a function of state information S.

Agent 10 obtains state information S and reward signal R from surroundings 11. Surroundings 11 in this case may include the following components: a reward signal generator 13, an internal state ascertainer 12, as well as CMA-ES applied to a problem instance 14.

Reward signal generator 13 is able to calculate a reward signal R as a function of state information S and, preferably of action A, as previously explained above. State ascertainer 12 determines the aforementioned states and, in particular, the teacher as well as the additional teacher. According to action A, CMA-ES is configured for problem instance 14 and its regular steps are carried out: "generating candidates of the following generation," "assessing the fitness," "adapting mean value m according to Equation 1," and "adapting covariance matrix c."

FIG. 1 further shows a processing unit 15, which is configured to carry out the calculation for this device, and a memory 16.

Figure 2:
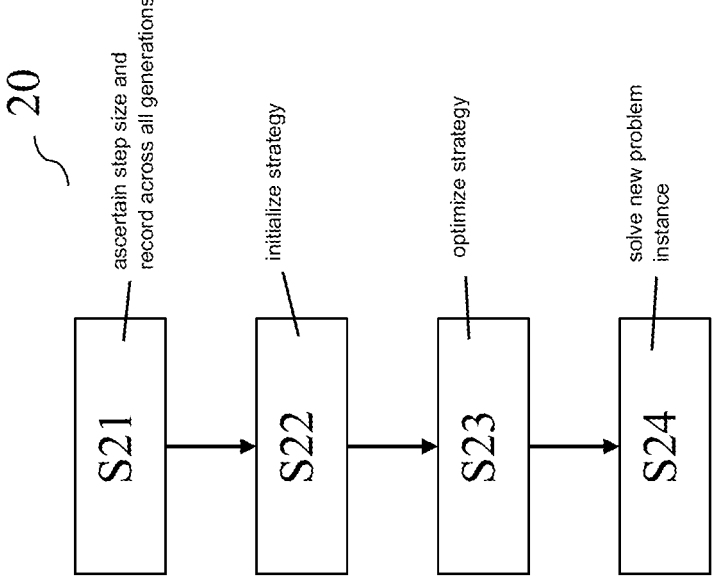
FIG. 2 schematically shows a flowchart of one specific embodiment of the present invention.

FIG. 2 schematically shows a flowchart 20 of one specific embodiment of the method according to the present invention.

The method starts with step S21. In this step, CMA-ES is applied for a given problem instance 14 and step size σ is ascertained and recorded across all generations. State ascertainer 12 may be used for this purpose.

This is followed by step S22, an initialization of strategy π. The strategy may, for example, be a neural network as previously mentioned, which ascertains step size σ as a function of the state information and randomly initializes its parameters, in particular weight.

This is followed by step S23. In this step, the reinforcement learning is applied in order to optimize strategy π. This may occur either in that agent 10 explores problem instance 14 and learns in the process how the agent is to choose actions A as a function of state information S in order to obtain a preferably strong reward signal R or sum of reward signals. State information S may, for example, be obtained via state ascertainer 12.

Step S23, upon completion, is followed by step S24. Once strategy if has been trained, it may be used in order to solve a new problem instance.

In one exemplary embodiment of the present invention, problem instance 14 may be a hyperparameter optimization. In this step, parameterizations for the hyperparameters may be optimized with the aid of CMA-ES and the strategy. The hyperparameter optimization may, for example, be used for hyperparameters of a learning algorithm for machine learning. A hyperparameter in this case may be a learning rate or a weighting of a regularization term in a cost function, which is used by the learning algorithm. If, for example, the learning rate is optimized, then as a heuristic, cosine annealing, an exponential-decaying learning rate, or a step-wise decaying learning rate may, for example, be used as an additional teacher for GPS.

The learning algorithm for machine learning is preferably used for training a machine learning system, in particular, a neural network, which is used, for example, for computer vision. Thus, for an object recognition or object localization or semantic segmentation, for example.

In one further exemplary embodiment, problem instance 14 may be a vehicle routing. In this case, a route for a vehicle is determined with the aid of CMA-ES and of strategy π.

Other problem instances may, for example, be scheduling and termination problems. Thus, it may be determined, for example, which production machine accepts and carries out which production/manufacturing order.

It should be noted that the principle of using a strategy described above for improving an evolutionary algorithm may be applied to further evolutionary algorithms. For example, a differential evolution (DE) algorithm may be used instead of CMA-ES. In this case, differential weight of differential evolution (DE) may then be adapted with the aid of the strategy. If GPS is used for learning the strategy, then the following heuristics may be used as teacher/additional teacher: DE-APC, ADP, SinDE, DE-random or SaMDE.

The machine learning system previously described above, which has been trained using the method according to the present invention, may be used as follows:

A surroundings is detected in preferably regular temporal intervals with the aid of a sensor, in particular, of an imaging sensor such as a video sensor, which may also be provided by a plurality of sensors, for example, a stereo camera. Other imaging sensors are also possible such as, for example, radar, ultrasound or LIDAR. An infrared camera is also possible. Sensor signal S—or in the case of multiple sensors, one sensor signal S each—of the sensor is transmitted to a control system. The control system thus receives a sequence of sensor signals S. The control system ascertains therefrom activation signals A, which are transferred to an actuator.

The control system receives the sequence of sensor signals S of the sensor in an optional receiving unit, which converts the sequence of sensor signals S into a sequence of input images x (alternatively, sensor signal S in each case may also be directly adopted as input image x). Input image x may, for example, be a detail or a further processing of sensor signal S. Input image x includes individual frames of a video recording. In other words, input image x is ascertained as a function of sensor signal S. The sequence of input images x is fed to a machine learning system, in the exemplary embodiment, to an artificial neural network.

The artificial neural network ascertains output variables y from input images x. These output variables y may include, in particular, a classification and/or semantic segmentation of input images x. Output variables y are fed to an optional forming unit, which ascertains therefrom activation signals A, which are fed to the actuator in order to activate actuator 10 accordingly. Output variable y includes pieces of information about objects that have been detected by the sensor.

The actuator receives activation signals A, is activated accordingly and carries out a corresponding action.

Figure 3:
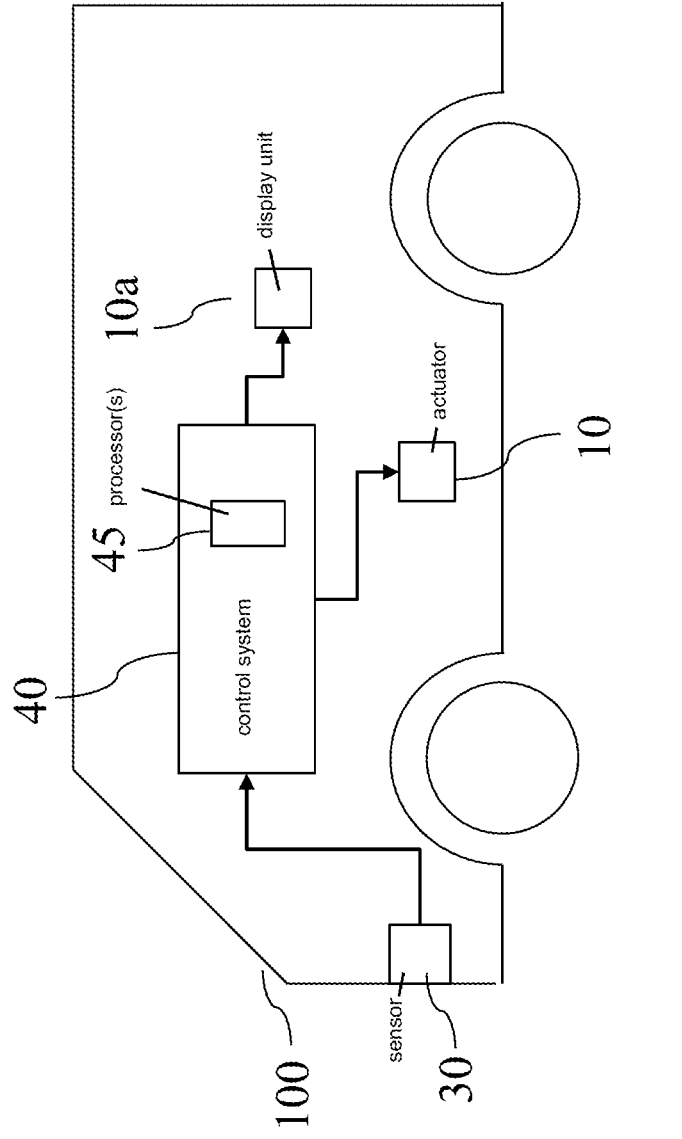
FIG. 3 schematically shows one exemplary embodiment for controlling an at least semi-autonomous robot, in accordance with the present invention.

FIG. 3 shows how control system 40 may be used for controlling an at least semi-autonomous robot, in this case, of an at least semi-autonomous motor vehicle 100.

Sensor 30 may, for example, be a video sensor situated preferably in motor vehicle 100.

Artificial neural network 60 is configured to reliably identify objects from input images x.

Actuator 10, situated preferably in motor vehicle 100, may be a brake, a drive or a steering of motor vehicle 100. Activation signal A may then be ascertained in such a way that actuator or actuators 10 is/are activated in such a way that motor vehicle 100, for example, prevents a collision with objects reliably identified by artificial neural network 60, in particular, if it involves objects of particular classes, for example, pedestrians.

Alternatively, the at least semi-autonomous robot may also be another mobile robot (not depicted), for example, one that moves by flying, swimming, diving or pacing. The mobile robot may, for example, also be an at least semi-autonomous lawn mower or an at least semi-autonomous cleaning robot. In these cases as well, activation signal A may be ascertained in such a way that the drive and/or the steering of the mobile robot is/are activated in such a way that the at least semi-autonomous robot, for example, prevents a collision with objects identified by artificial neural network 60.

In further preferred specific embodiments, control system 40 includes one or multiple processors 45 and at least one machine-readable memory medium, on which instructions are stored which, when they are executed on processors 45, prompt control system 40 to carry out the method according to the present invention.

In alternative specific embodiments, a display unit 10a is provided alternatively or in addition to actuator 10. Alternatively or in addition, display unit 10a may be activated using activation signal A and, for example, the ascertained safe areas may be displayed. It is also possible, for example, in the case of a motor vehicle 100 that has no power steering, for display unit 10a to be activated using activation signal A in such a way that it outputs a visual or acoustic warning signal if it is ascertained that motor vehicle 100 threatens to collide with one of the reliably identified objects.

Figure 4:
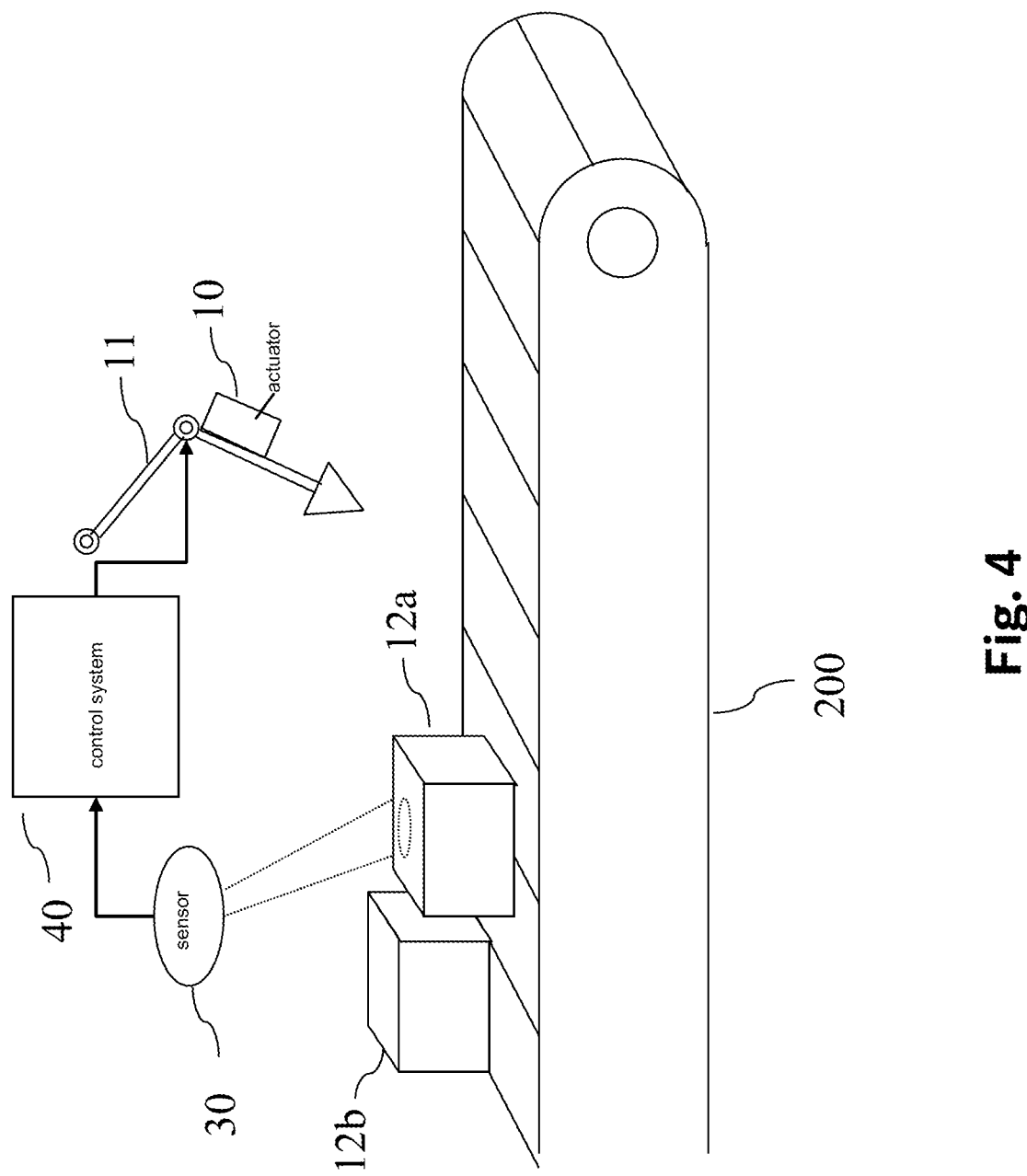
FIG. 4 schematically shows one exemplary embodiment for controlling a manufacturing system, in accordance with the present invention.

FIG. 4 shows one exemplary embodiment, in which control system 40 is used for activating a manufacturing machine 11 of a manufacturing system 200 by activating an actuator 10 that controls this manufacturing machine 11. Manufacturing machine 11 may, for example, be a machine for punching, sawing, drilling and/or cutting.

Sensor 30 may then, for example, be an optical sensor, which detects properties of manufactured products 12a, 12b, for example. It is possible that these manufactured products 12a, 12b are movable. It is possible that actuator 10 controlling manufacturing machine 11 is activated as a function of an assignment of detected manufactured products 12a, 12b, so that manufacturing machine 11 accordingly carries out a subsequent processing step of the correct one of manufactured products 12a, 12b. It is also possible that by identifying the correct properties of the same manufactured products 12a, 12b (i.e., with no misclassification), manufacturing machine 11 adapts corresponding to the same manufacturing step for a processing of a subsequent manufactured product.

Figure 5:
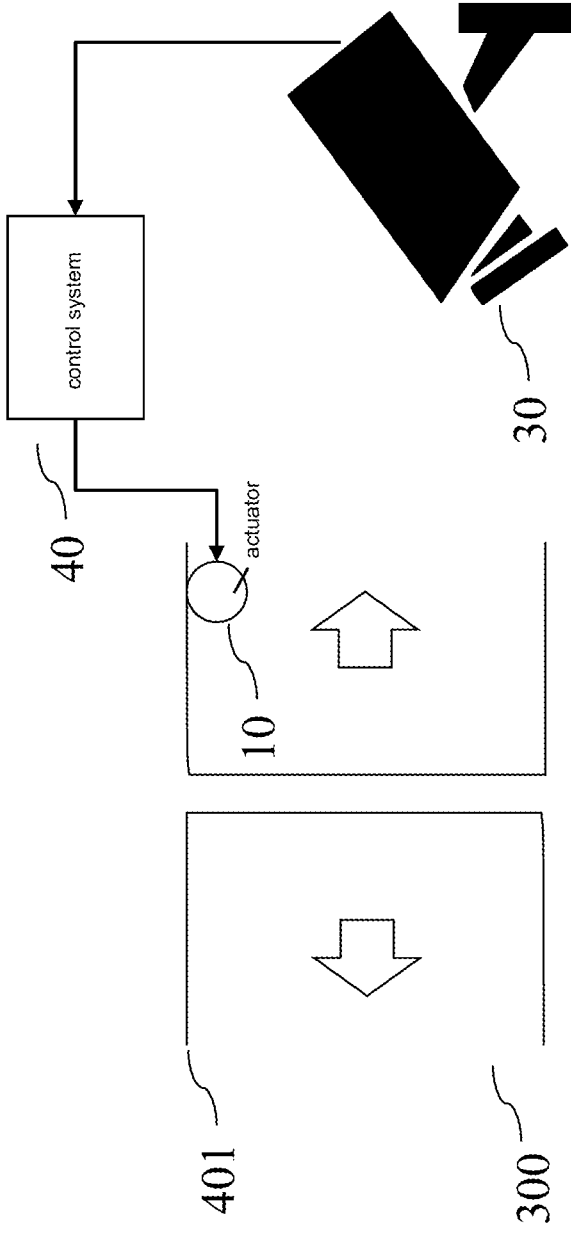
FIG. 5 schematically shows one exemplary embodiment for controlling an access system, in accordance with the present invention.

FIG. 5 shows one exemplary embodiment, in which control system 40 is used for controlling an access system 300. Access system 300 may include a physical access control, for example, a door 401. Video sensor 30 is configured to detect a person. With the aid of object identification system 60, it is possible to interpret this captured image. If multiple persons are detected simultaneously, it is possible to particularly reliably ascertain the identity of the persons by an assignment of the persons (i.e., the objects) relative to one another, for example, by analyzing their movements. Actuator 10 may be a lock, which releases or does not release the access control as a function of activation signal A, for example, opens or does not open door 401. For this purpose, activation signal A may be selected as a function of the interpretation of object identification system 60, for example, as a function of the ascertained identity of the person. Instead of the physical access control, a logical access control may also be provided.

Figure 6:
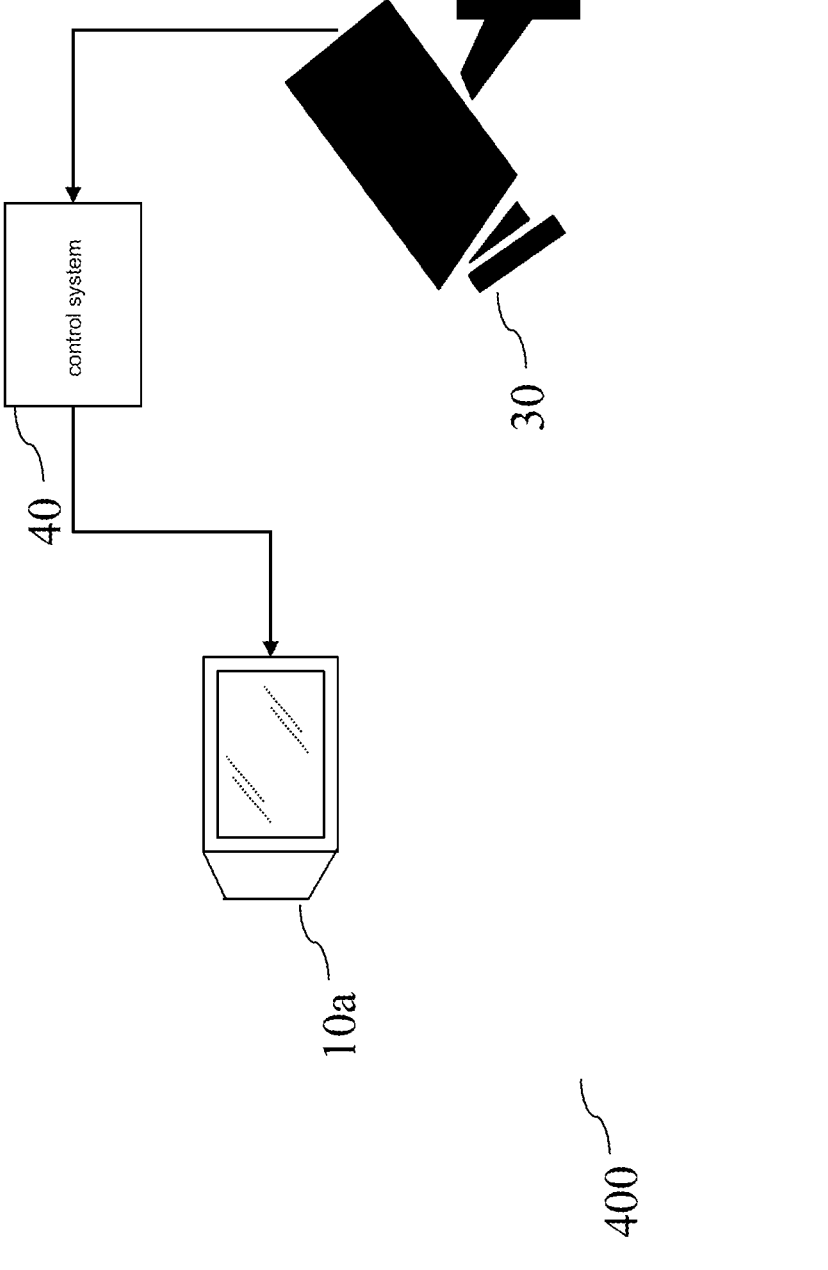
FIG. 6 schematically shows one exemplary embodiment for controlling a monitoring system, in accordance with the present invention.

FIG. 6 shows one exemplary embodiment, in which control system 40 is used for controlling a monitoring system 400. This exemplary embodiment differs from the exemplary embodiment represented in FIG. 5 in that instead of actuator 10, display unit 10a is provided, which is activated by control system 40. For example, an identity of the objects recorded by video sensor 30 may be reliably ascertained by artificial neural network 60 in order, for example, to conclude as a function thereof which become suspect, and activation signal A may then be selected in such a way that this object is color-highlighted by display unit 10a.

Figure 7:
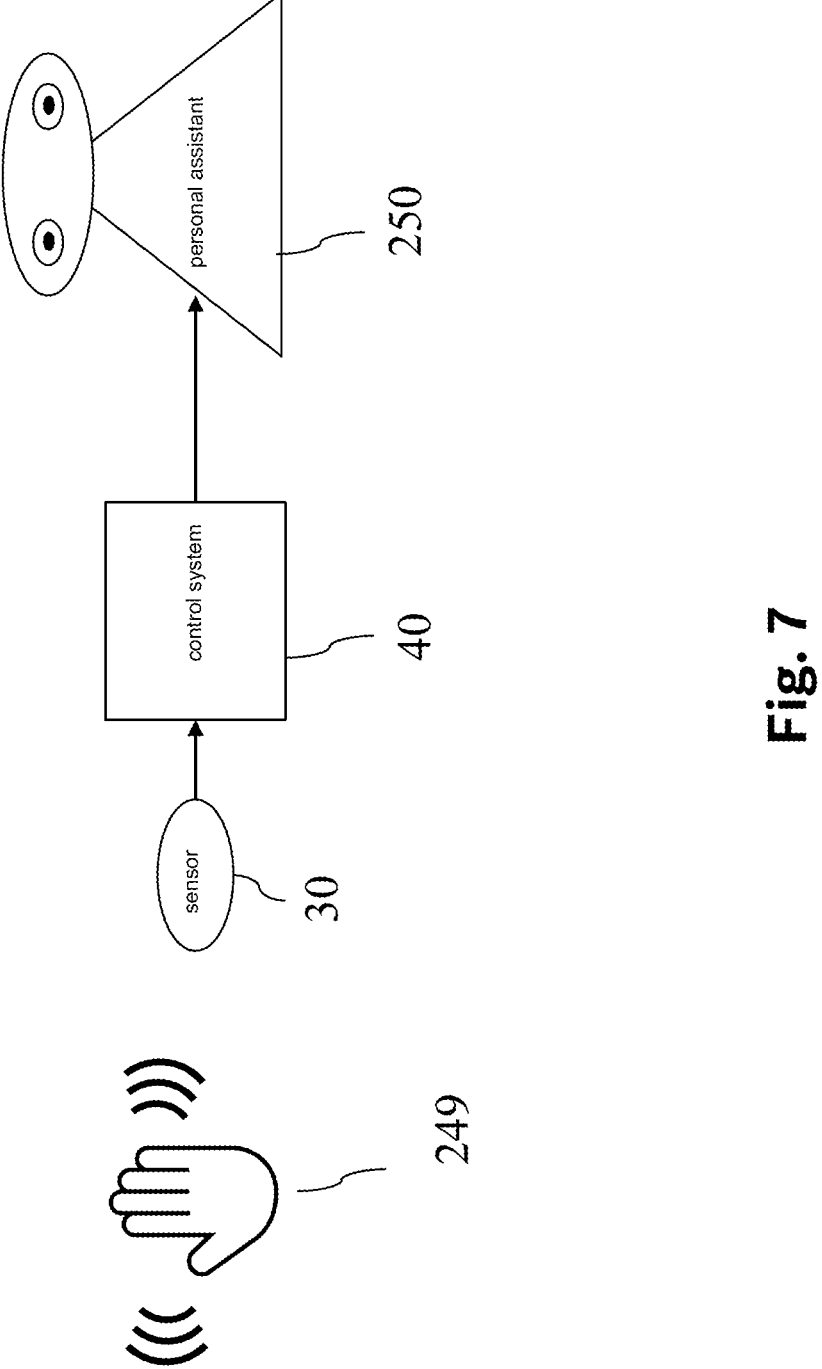
FIG. 7 schematically shows one exemplary embodiment for controlling a personal assistant, in accordance with the present invention.

FIG. 7 shows one exemplary embodiment, in which control system 40 is used for controlling a personal assistant 250. Sensor 30 is preferably an optical sensor, which receives images of a gesture of a user 249.

Control system 40 ascertains an activation signal A of personal assistant 250 as a function of the signals of sensor 30, for example, by the neural network carrying out a gesture recognition. This ascertained activation signal A is then transmitted to personal assistant 250 and activates it accordingly. This ascertained activation signal A may be selected, in particular, in such a way that it corresponds to a presumed desired activation by user 249. This presumed desired activation may be ascertained as a function of the gesture recognized by artificial neural network 60. Control system 40 may then select activation signal A for transmission to personal assistant 250 as a function of the presumed desired activation, and/or may select activation signal A for transmission to the personal assistant according to presumed desired activation 250.

This corresponding activation may include, for example, that personal assistant 250 retrieves pieces of information from a database and reproduces them in a way that is perceptible for user 249.

Instead of personal assistant 250, a household appliance (not depicted), in particular, a washing machine, a stove, a baking oven, a microwave or a dishwasher may also be provided in order to be activated accordingly.

Figure 8:
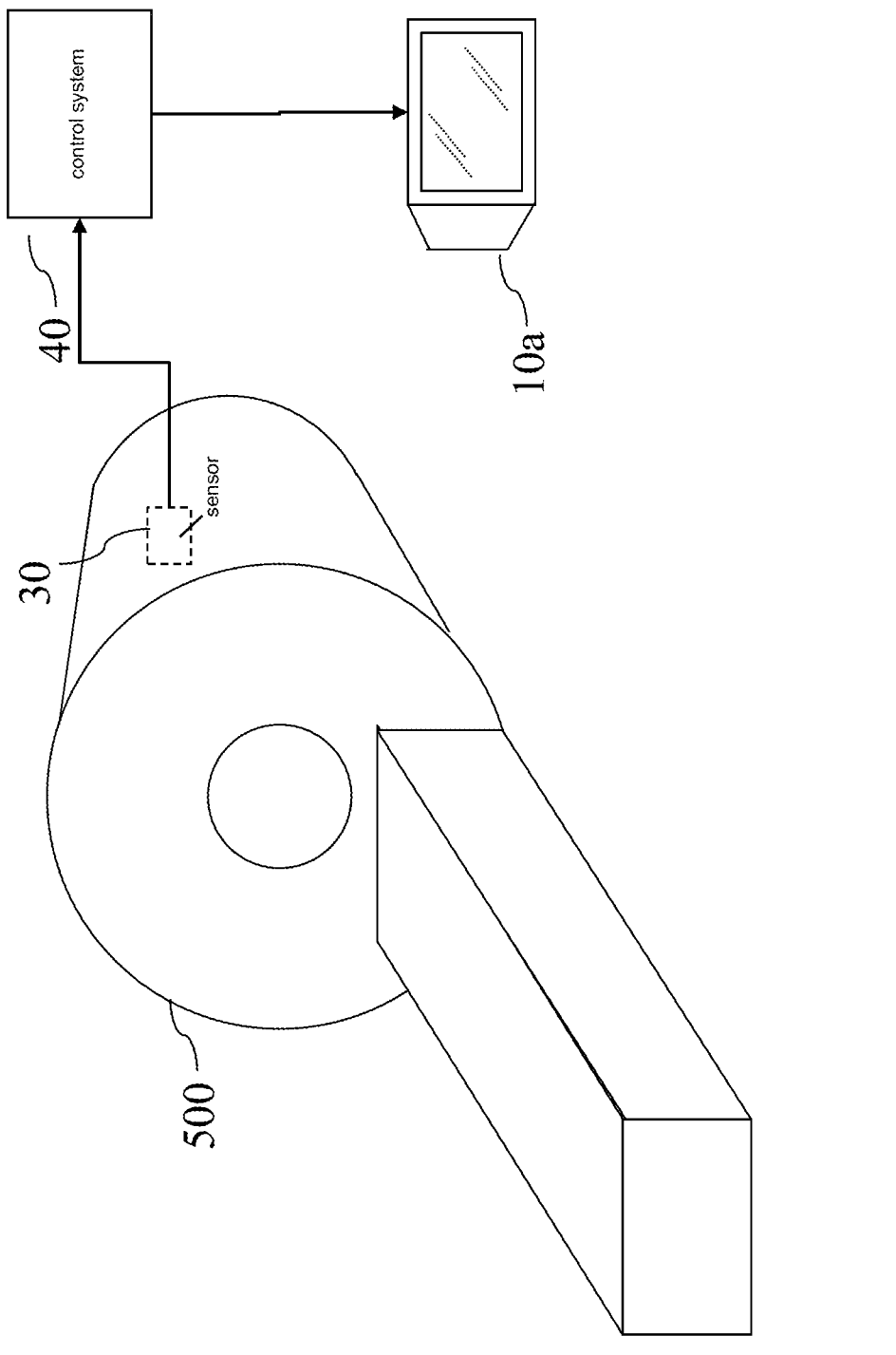
FIG. 8 schematically shows one exemplary embodiment for controlling a medical imaging system, in accordance with the present invention.

FIG. 8 shows one exemplary embodiment, in which control system 40 is used for controlling a medical imaging system 500, for example, an MRT device, x-ray device or ultrasound device. Sensor 30 may be provided, for example, by an imaging sensor, display unit 10a is activated by control system 40. For example, it may be ascertained by neural network 60 whether an area recorded by the imaging sensor is conspicuous, and activation signal A is then selected in such a way that this area is color-highlighted by display unit 10a.

The term "computer" encompasses arbitrary devices for handling predefinable calculation specifications. These calculation specifications may be present in the form of software, or in the form of hardware, or also in a mixed form of software and hardware.

What is claimed is:

1. A computer-implemented method for learning a strategy, which optimally adapts at least one parameter of an evolutionary algorithm, the evolutionary algorithm being a Covariance Matrix Adaptation Evolution Strategy (CMA-ES) or differential evolution algorithm, the method comprising the following steps:

initializing the strategy, which ascertains a parameterization of the at least one parameter as a function of pieces of state information about a problem instance; and learning the strategy using reinforcement learning, the strategy being learned with a reward signal and from interactions of the CMA-ES algorithm (i) with the parameterization, the parameterization being determined using the strategy as a function of the pieces of state information and (ii) with the problem instance, wherein the parameterization is optimal for possible pieces of state information, wherein:

the problem instance is a training method for machine learning, hyperparameters of the training method being optimized based on CMA-ES using the strategy, a deep neural network is trained using at least one of the optimized hyperparameters to produce a trained neural network, the trained neural network ascertains an output variable and controls an actuator that controls a physical operation of a technical system, wherein the output variable is used to ascertain a control variable for controlling the actuator.

2. The method as recited in claim 1, wherein the parameter is a step size of the CMA-ES algorithm, and/or a population size, and/or a mutation rate, and/or a crossover rate.

3. The method as recited in claim 1, wherein the pieces of state information include a present parameterization of the parameter and a cumulative path length, and/or at least one value which is a difference between functional values of a function of the problem instance of a present iteration to be optimized and preceding iterations.

4. The method as recited in claim 1, wherein the reinforcement learning is employed using Guided Policy Search (GPS), parameterizations of the parameters for the problem instance being determined using a predefinable heuristic and a plurality of profiles of the parameterizations of the parameter are recorded, a teacher for learning the strategy being provided from the profiles using GPS.

5. The method as recited in claim 4, wherein the GPS is supplemented by a sampling rate, the sampling rate characterizing with which probability the strategy learns from an additional teacher or from the teacher, the additional teacher including a further profile of values of the parameters.

6. The method as recited in claim 5, wherein the sampling rate is 0.3.

7. A method for implementing a learned strategy which optimally adapts at least one parameter of an evolutionary algorithm, the evolutionary algorithm being a Covariance Matrix Adaptation Evolution Strategy (CMA-ES) or differential evolution algorithm, the strategy being learned by initializing the strategy, which ascertains a parameterization of the at least one parameter as a function of pieces of state information about a problem instance, and learning the strategy using reinforcement learning, the strategy being learned with a reward signal and from interactions of the CMA-ES algorithm (i) with the parameterization, the parameterization being determined using the strategy as a function of the pieces of state information and (ii) with the problem instance, wherein the parameterization is optimal for possible pieces of state information, the method comprising:

determining the state information for the problem instance;

ascertaining by the learned strategy a parameterization as a function of the state information, CMA-ES including the parameterization being applied for at least one iteration, wherein:

the problem instance is a training method for machine learning, hyperparameters of the training method being optimized based on CMA-ES using the strategy,

a deep neural network is trained using at least one of the optimized hyperparameters to produce a trained neural network, the trained neural network ascertains an output variable and controls an actuator that controls a physical operation of a technical system, wherein the output variable is used to ascertain a control variable for controlling the actuator.

8. The method as recited in claim 7, wherein: the problem instance is a vehicle routing optimization or an order planning in manufacturing/production and the route or the order planning being optimized based on CMA-ES using the strategy.

9. A device for learning a strategy, which optimally adapts at least one parameter of an evolutionary algorithm, the evolutionary algorithm being a Covariance Matrix Adaptation Evolution Strategy (CMA-ES) or differential evolution algorithm, the device configured to:

initialize the strategy, which ascertains a parameterization of the at least one parameter as a function of pieces of state information about a problem instance; and learn the strategy using reinforcement learning, the strategy being learned with a reward signal and from interactions of the CMA-ES algorithm (i) with the parameterization, the parameterization being determined using the strategy as a function of the pieces of state information and with the problem instance, wherein the parameterization is optimal for possible pieces of state information, wherein:

the problem instance is a training method for machine learning, hyperparameters of the training method being optimized based on CMA-ES using the strategy, a deep neural network is trained using at least one of the optimized hyperparameters to produce a trained neural network, the trained neural network ascertains an output variable and controls an actuator that controls a physical operation of a technical system, wherein the output variable is used to ascertain a control variable for controlling the actuator.

10. A non-transitory machine-readable memory medium on which is stored a computer program for learning a strategy, which optimally adapts at least one parameter of an evolutionary algorithm, the evolutionary algorithm being a Covariance Matrix Adaptation Evolution Strategy (CMA-ES) or differential evolution algorithm, the computer program, when executed by a computer, causing the computer to perform the following steps:

initializing the strategy, which ascertains a parameterization of the at least one parameter as a function of pieces of state information about a problem instance; and learning the strategy using reinforcement learning, the strategy being learned with a reward signal and from interactions of the CMA-ES algorithm (i) with the parameterization, the parameterization being determined using the strategy as a function of the pieces of state information and (ii) with the problem instance, wherein the parameterization is optimal for possible pieces of state information, wherein:

the problem instance is a training method for machine learning, hyperparameters of the training method being optimized based on CMA-ES using the strategy, a deep neural network is trained using at least one of the optimized hyperparameters to produce a trained neural network, the trained neural network ascertains an output variable and controls an actuator that controls a physical operation of a technical system, wherein the output variable is used to ascertain a control variable for controlling the actuator.

\* \* \* \* \*